(12) United States Patent
Mahajan et al.

(10) Patent No.: US 10,171,378 B2
(45) Date of Patent: Jan. 1, 2019

(54) SYSTEM AND METHOD FOR ALLOCATING AND RESERVING SUPERVISORS IN A REAL-TIME DISTRIBUTED PROCESSING PLATFORM

(71) Applicant: Impetus Technologies, Inc., Los Gatos, CA (US)

(72) Inventors: Aashu Mahajan, Los Gatos, CA (US); Hokam Singh Chauhan, Indore (IN); Saurabh Dutta, Indore (IN); Punit Shah, Los Gatos, CA (US)

(73) Assignee: IMPETUS TECHNOLOGIES, INC., Los Gatos, CA (US)

( * ) Notice: Subject to any disclaimer, the term of this patent is extended or adjusted under 35 U.S.C. 154(b) by 170 days.

(21) Appl. No.: 15/348,572

(22) Filed: Nov. 10, 2016

(65) Prior Publication Data

US 2017/0134305 A1 May 11, 2017

Related U.S. Application Data

(60) Provisional application No. 62/253,254, filed on Nov. 10, 2015.

(51) Int. Cl.
*H04L 12/927* (2013.01)
*H04L 12/24* (2006.01)
*H04L 12/911* (2013.01)

(52) U.S. Cl.
CPC ............ *H04L 47/803* (2013.01); *H04L 41/22* (2013.01); *H04L 47/783* (2013.01); *H04L 47/801* (2013.01)

(58) Field of Classification Search
CPC ..... H04L 41/22; H04L 47/783; H04L 47/801; H04L 47/803
See application file for complete search history.

(56) References Cited

U.S. PATENT DOCUMENTS

| | | | |
|---|---|---|---|
| 7,092,985 B2 | 8/2006 | Hubbard | |
| 8,473,594 B2 | 6/2013 | Astete et al. | |
| 8,671,407 B2 | 3/2014 | Ballani et al. | |
| 9,172,608 B2 | 10/2015 | Zeyliger et al. | |
| 9,628,404 B1 * | 4/2017 | Goffinet | ............. H04L 41/5067 |

(Continued)

OTHER PUBLICATIONS

Jim Pruyne, Miron Livny, "Parallel Processing on Dynamic Resources with CARMI", Apr. 25, 1995, pp. 259-278, Springer-Verlag London, UK © 1995.

*Primary Examiner* — Gil H. Lee
(74) *Attorney, Agent, or Firm* — Hayes Soloway P.C.

(57) ABSTRACT

The present disclosure relates to system(s) and method(s) for allocating and reserving one or more supervisors, to be used by a data processing pipeline associated with a tenant, of a real-time distributed processing platform, is disclosed. The system is configured to identify a set of supervisors corresponding to a set of computing machines of a real-time distributed processing platform. One the set of supervisors is identified, the system enables a primary user to assign a subset of supervisors from the set of supervisors to a tenant. Further, the enables a secondary user, corresponding to the tenant, to design a set of data processing pipelines in a workspace. Further, the system further enables assigning one or more supervisors from the subset of supervisors to each data processing pipeline from the set of data processing pipelines based on the inputs received from the secondary user.

11 Claims, 5 Drawing Sheets

(56) References Cited

U.S. PATENT DOCUMENTS

| | | |
|---|---|---|
| 2002/0059274 A1 | 5/2002 | Hartsell et al. |
| 2015/0052535 A1* | 2/2015 | Fujii .................. G06F 9/46 |
| | | 718/104 |
| 2015/0248315 A1* | 9/2015 | Ragupathi ........... H04L 41/0806 |
| | | 709/226 |
| 2016/0057076 A1* | 2/2016 | Zlati .................... H04L 47/783 |
| | | 709/201 |
| 2016/0179063 A1 | 6/2016 | De Baynast De Septfontaines et al. |
| 2017/0083368 A1* | 3/2017 | Bishop .................... G06F 9/505 |

* cited by examiner

SYSTEM AND METHOD FOR ALLOCATING AND RESERVING SUPERVISORS IN A REAL-TIME DISTRIBUTED PROCESSING PLATFORM

CROSS-REFERENCE TO RELATED APPLICATIONS AND PRIORITY

The present application claim priority from U.S. provisional patent application 62/253,254 titled "System and method for allocation of resources in Apache® storm-based topologies" dated Nov. 10, 2015.

TECHNICAL FIELD

The present disclosure described herein, in general, relates to distributed computing, and more particularly to a system and method for allocating supervisors in real-time distributed framework such as Apache® STORM based network topologies.

BACKGROUND

Distributed computing has enabled to analyze data of size ranging from terabytes to petabytes. Typically, the distributed computing based frameworks have been able to handle and process Big Data and applications developed based on the Big Data. In order to process the Big Data in real-time, distributed computing framework such as Apache® STORM technology is being used. In the Apache® STORM technology, each computing task of a plurality of computing tasks are distributed, for execution, onto multiple supervisors available in the Apache® STORM. Each supervisor is associated with a computing machine available in the Apache® STORM. In other words, supervisors are allocated for executing each of the computing tasks in order to obtain desired outcome of the Big Data Processing. Typically, a network based topology or a pipeline of processors is formed containing multiple processor(s) designating the plurality of computing tasks to be executed. Therefore, the supervisors in the Apache® STORM are to be allocated to the topology or the pipeline of processors. It is to be noted that each supervisor is configured to assign one or more workers from a set of workers enabled over the computing machine, to a pipeline. Further it is to be noted that each worker, from the set of worker, corresponds to processing unit comprising at least a CPU and a RAM.

In the background art, the allocation/scheduling of supervisors/resources is based on Round Robin technique and hence is not under the control of an administrator/user of the systems. The Round Robin technique allocates the resources to the topologies based on the availability of the resources. However, the Round Robin technique fails to achieve optimal allocation of resources and thereby leading to increase in overall processing time and decrease in processing speed of executing the plurality of computing tasks. For instance, if the user has a storm cluster of ten machines and out of the ten machines, only five machines are having better resources in terms of CPU and RAM, then in this scenario, if the user utilizes the existing Round Robin technique for the allocation, there will be a problem of performance degradation since the topology resources may get assigned on the computing machines where CPU and RAM resources are very low. Another technical problem faced by the current methodology of allocating resources is that the resources being allocated might face internet connectivity issue thereby impacting the execution of the computing tasks in the distributed network.

SUMMARY

This summary is provided to introduce aspects related to systems and methods for allocating and reserving one or more supervisors, to be used by a data processing pipeline associated with a tenant, of a real-time distributed processing platform such as Apache® storm-based topologies and the concepts are further described below in the detailed description. This summary is not intended to identify essential features of subject matter nor is it intended for use in determining or limiting the scope of the subject matter.

In one embodiment, a system for allocating and reserving one or more supervisors, to be used by a data processing pipeline associated with a tenant, of a real-time distributed processing platform, is disclosed. The system comprises a memory and a processor coupled to the memory, wherein the processor is configured to execute program instructions stored in the memory. In one embodiment, the processor may execute programmed instructions stored in the memory for identifying a set of supervisors corresponding to a set of computing machines of a real-time distributed processing platform. Further, the processor may execute programmed instructions stored in the memory for assigning a subset of supervisors from the set of supervisors to a tenant based on inputs provided by a primary user. Further, the processor may execute programmed instructions stored in the memory for enabling a secondary user, corresponding to the tenant, to design a set of data processing pipelines in a workspace. In one embodiment, each data processing pipeline may comprise one or more data processing components from a set of data processing components, and wherein each data processing pipeline is configured to process a real time data stream. Furthermore, the processor may execute programmed instructions stored in the memory for assigning one or more supervisors from the subset of supervisors to each data processing pipeline from the set of data processing pipelines based on the inputs received from the secondary user.

In one embodiment, a method for allocating and reserving one or more supervisors, to be used by a data processing pipeline associated with a tenant, of a real-time distributed processing platform, is disclosed. The method may comprise identifying a set of supervisors corresponding to a set of computing machines of a real-time distributed processing platform. The method may further comprise assigning a subset of supervisors from the set of supervisors to a tenant based on inputs provided by a primary user. The method may further comprise enabling a secondary user, corresponding to the tenant, to design a set of data processing pipelines in a workspace. In one embodiment, each data processing pipeline may comprise one or more data processing components from a set of data processing components, and wherein each data processing pipeline is configured to process a real time data stream. The method may further comprise assigning one or more supervisors from the subset of supervisors to each data processing pipeline from the set of data processing pipelines based on the inputs received from the secondary user.

In one embodiment, a non-transitory computer readable medium embodying a program executable in a computing device for allocating and reserving one or more supervisors, to be used by a data processing pipeline associated with a tenant, of a real-time distributed processing platform, is disclosed. The program comprises a program code for identifying a set of supervisors corresponding to a set of computing machines of a real-time distributed processing platform. The program comprises a program code for assigning a subset of supervisors from the set of supervisors to a tenant based on inputs provided by a primary user. The program comprises a program code for enabling a secondary user, corresponding to the tenant, to design a set of data processing pipelines in a workspace. In one embodiment, each data processing pipeline may comprise one or more data processing components from a set of data processing components, and wherein each data processing pipeline is configured to process a real time data stream. The program comprises a program code for assigning one or more supervisors from the subset of supervisors to each data processing pipeline from the set of data processing pipelines based on the inputs received from the secondary user.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

In one embodiment, a system and method for allocating and reserving one or more supervisors, to be used by a data processing pipeline associated with a tenant, of a real-time distributed processing platform, is disclosed. The system is configured to identify a set of supervisors corresponding to a set of computing machines of a real-time distributed processing platform. One the set of supervisors is identified, the system enables a primary user to assign a subset of supervisors from the set of supervisors to a tenant. Further, the enables a secondary user, corresponding to the tenant, to design a set of data processing pipelines in a workspace. Further, the system further enables assigning one or more supervisors from the subset of supervisors to each data processing pipeline from the set of data processing pipelines based on the inputs received from the secondary user.

Figure 1:
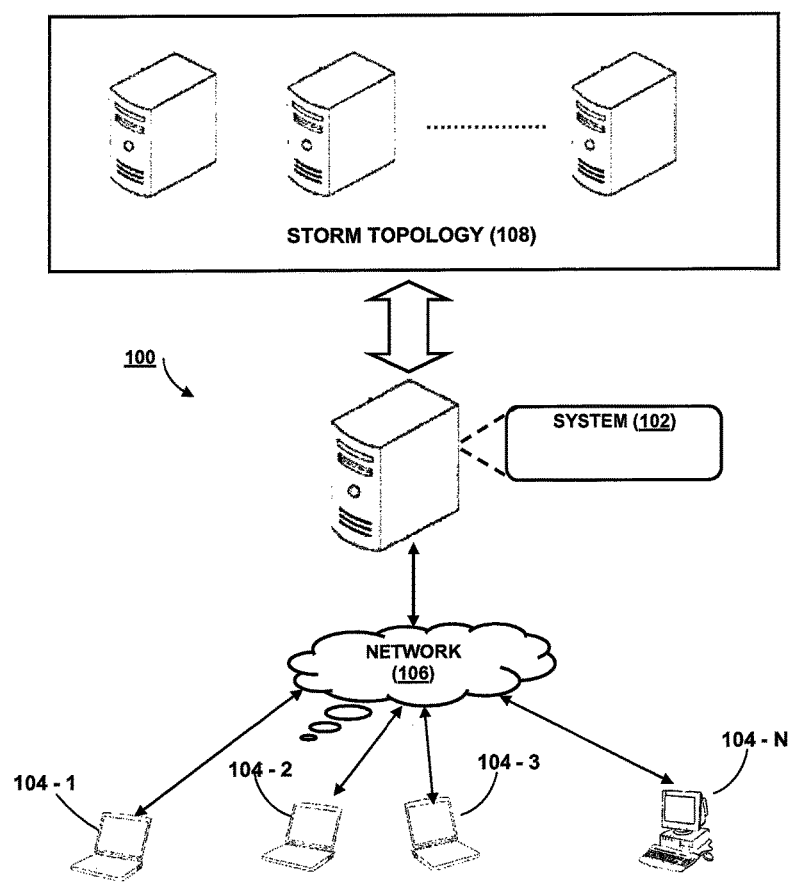
FIG. 1 illustrates a network implementation of a system for allocating and reserving one or more supervisors, to be used by a data processing pipeline associated with a tenant, of a real-time distributed processing platform, in accordance with an embodiment of the present subject matter.

Referring to FIG. 1, a network implementation 100 of a system 102 for allocating and reserving one or more supervisors, to be used by a data processing pipeline associated with a tenant, of a real-time distributed processing platform is illustrated, in accordance with an embodiment of the present subject matter. The system 102 is coupled to the real-time distributed processing platform 108 such as an Apache® storm topology (also refereed hereinafter as "storm" or "storm cluster" interchangeably) containing multiple computing machines. Although the present disclosure is explained considering that the system 102 is implemented as a software application on a server, it may be understood that the system 102 may also be implemented as a variety of computing systems, such as a laptop computer, a desktop computer, a notebook, a workstation, a mainframe computer, a server, a network server, a tablet, a mobile phone, and the like. In one implementation, the system 102 may be implemented in a cloud-based environment. It will be understood that the system 102 may be accessed by multiple users through one or more user devices 104-1, 104-2 . . . 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
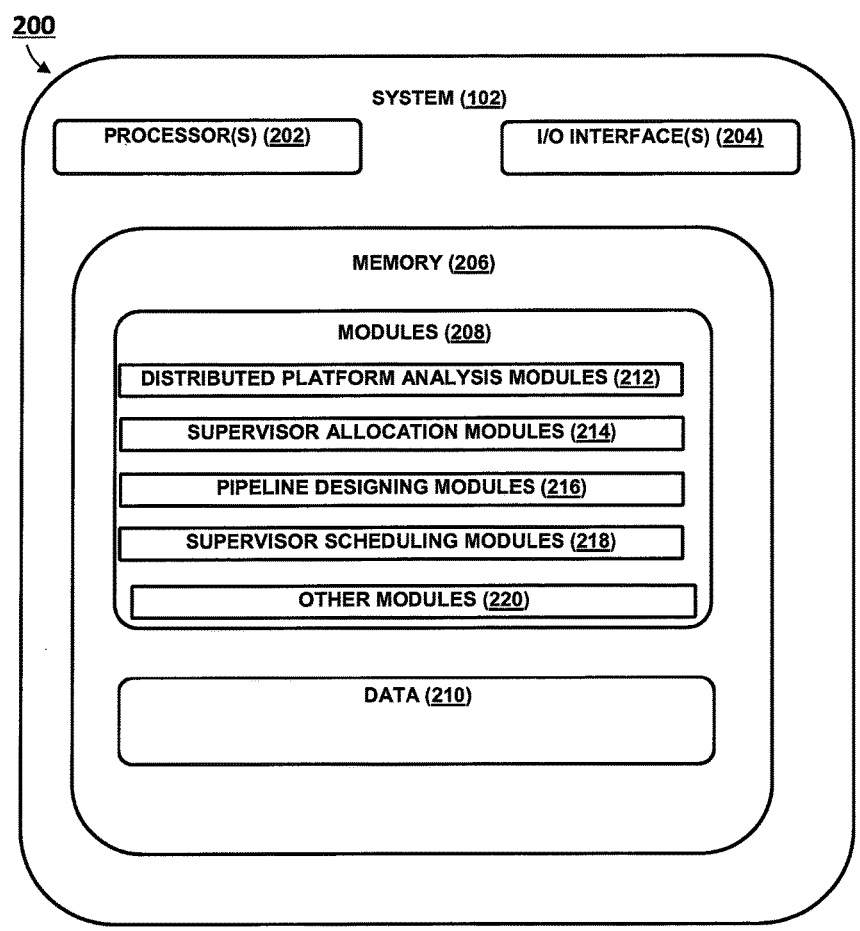
FIG. 2 illustrates architecture of the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions or modules stored in the memory 206.

The I/O interface 204 may include a variety of software and hardware interfaces, for example, a web interface, a graphical user interface, and the like. The I/O interface 204 may allow the system 102 to interact with a user. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes. The memory 206 may include modules 208 and data 210.

The modules 208 include routines, programs, objects, components, data structures, etc., which perform particular tasks or implement particular abstract data types. In one implementation, the modules 208 may include a distributed platform analysis module 212, a supervisor allocation module 214, a pipeline designing module 216, a supervisor scheduling module 218 and other modules 220. The other modules 220 may include programs or coded instructions that supplement applications and functions of the system 102. The data 210, amongst other things, serves as a repository for storing data processed, received, and generated by one or more of the modules 208. The detailed description of the system 102 is explained in detail as below.

Referring to FIG. 2, the processor 202 may be enabled to execute the modules 208 stored in the memory 206 in order to control allocation of supervisors in real-time distributed processing platform 108 (Apache® storm-based topologies). In order to allocate the supervisors, initially the distributed platform analysis module 212 is configured to identify a set of supervisors corresponding to a set of computing machines of the real-time distributed processing platform. In one embodiment, a supervisor may be associated with one or more computing machines from the set of computing machines of the real-time distributed processing platform 108. Further, each computing machine may also be linked to one or more supervisors. In one embodiment, the supervisor is an application running on the computing machine for allocation of a set of workers/resources running on the computing machined to one or more pipelines designed for execution over the real-time distributed processing platform 108.

Further, the supervisor allocation module 214 is configured to enable a primary user to log into the system 102 and assigning a subset of supervisors from the set of supervisors to a tenant based on inputs provided by a primary user. The primary user may be an administrator of the real-time distributed processing platform 108. The tenant may be a customer or company registered at the real-time distributed processing platform 108 for seeking services of the real-time distributed processing platform 108.

Further, the pipeline designing module 216 is configured to enable a secondary user, corresponding to the tenant, to design a set of data processing pipelines in a workspace. It is to be noted that the workspace comprises Graphical User Interface (GUI)/canvas in order to enable the secondary user to design each data processing pipeline from the set of data processing pipelines. In one embodiment, the secondary user may use pick and place data processing unit from the one or more data processing units available over the workspace for designing the data processing pipeline. Each of the data processing unit indicates a phase in the data processing pipeline. Further, each data processing pipeline comprises one or more data processing components from a set of data processing components, and wherein each data processing pipeline is configured to process a real time data stream specified by the secondary user.

In one embodiment, the pipelines designing module 216 may enable the secondary user to assign one or more computing machines in the real-time data processing platform to the workspace associated with the tenant. Further, for each computing machine, the pipelines designing module 216 may assign a supervisor enabled to allocate resources (or workers) associated with the computing machine for executing the computing tasks corresponding to each phase/data processing units in the miming data processing pipeline. It must be understood to one skilled in the art that each worker/resource herein refers to an amount/part/section of CPU or RAM required for executing the computing tasks in the running data processing pipeline. In an embodiment, each computing machine may comprise multiple workers depending upon the configuration of the computing machine.

In one embodiment, once the workspace is created, the list of supervisors is tagged corresponding to the workspace depending on the number of computing machines assigned to the workspace. It is to be noted that each computing machine has at least one supervisor associated with the said computing machine, wherein the supervisor is adapted for controlling the allocation of the workers associated with the computing machine for executing the running data processing pipeline. In an embodiment, the secondary user may configure the one or more machines for the execution of the running data processing pipeline through the GUI.

In an embodiment, once the secondary user designs the data processing pipeline corresponding to the workspace, the GUI may display the list of computing machine assigned to the workspace. In one embodiment, the secondary user may assign one or multiple computing machines for executing the data processing pipeline. The number of workers corresponding to each computing machines may be assigned by the supervisor corresponding to each computing machine. The allocation of workers depends upon the requirements associated with execution of each of the computing tasks for executing the data processing pipeline.

Further, the supervisor scheduling module 218 is configured to assign one or more supervisors from the subset of supervisors to each data processing pipeline from the set of data processing pipelines based on the inputs received from the secondary user. In one embodiment, each supervisor is configured to operate a set of workers, wherein the supervisor is configured to allocate one or more workers, from the set of workers, to each data processing pipeline based on the inputs provided by the secondary user. In one embodiment, each worker, from the set of worker, corresponds to a portion of Central processing Unit (CPU) and a Portion of Random Access Memory (RAM) available at a computing machine from the set of computing machines.

In an embodiment, the supervisor scheduling module 218 may enable the secondary user to control the allocation of one or more computing machines in fair manner. For instance, the secondary user may prioritize the computing machines that are underutilized or non-utilized at all. Similarly, the secondary user may monitor the performance of the workers and re-allocate the workers in real time based upon the performance being monitored. The GUI may provide an alert if all the workers are being utilized and there are no workers available for allocation to a new pipeline. In an embodiment, the GUI may be electronically coupled with the real-time data processing platform 108 which provides the information about the availability of the workers in real time to the secondary user through the GUI. In a particular embodiment, the processor 202 may obtain the information regarding the availability of the resources from the real-time distributed processing platform 108 using Application Programming Interfaces (APIs) supported by the real-time distributed processing platform 108.

In an embodiment, the allocation of the workers further involves utilizing workers, for the execution, from multiple machines simultaneously. For instance, in the current art, in case of parallel execution of computing tasks workers of the same computing machine is utilized. Particularly, the execution of the computing tasks via multiple threads is implemented on the one or more workers of the same computing machine. However, in accordance with the present system 102, for execution of the computing tasks concurrently or in parallel, the supervisor may allocate one workers from a computing machine and another workers from other computing machine. This facilitates in efficient utilization of workers allocated. The detailed method steps of resource allocation are now described referring to FIGS. 3 and 4.

Figure 3:
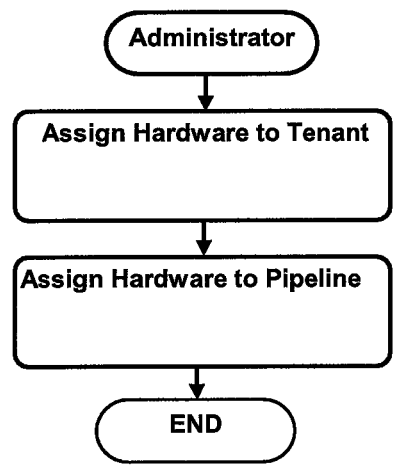
FIGS. 3 and 4 illustrate method(s) of allocating and/or scheduling resources for the real-time distributed processing platform, in accordance with an embodiment of the present subject matter.
Figure 4:
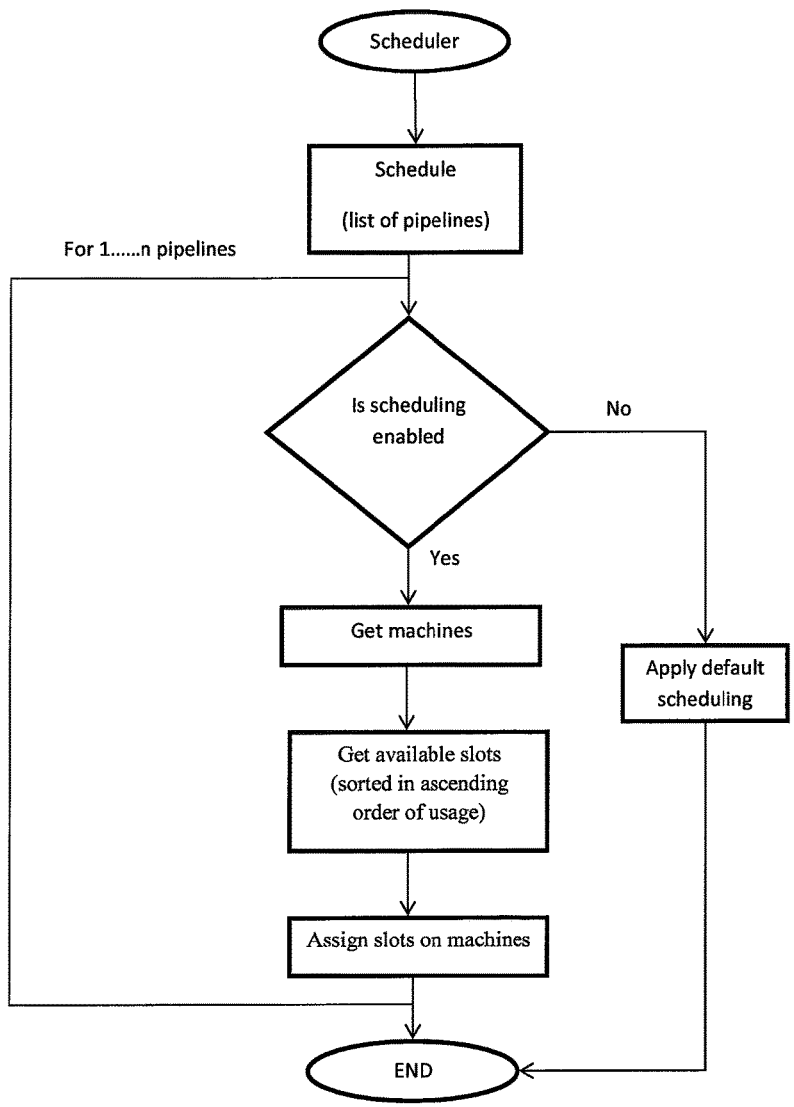

FIG. 3 illustrates a method of allocating supervisors to data processing pipelines in accordance with an embodiment of the present disclosure. As shown, the administrator (primary user) of the system 102 may assign a subset of supervisors to a tenant. The subset of supervisors corresponds to one or more computing machines belonging to the storm topology 108 as shown in FIG. 1. In one embodiment, each supervisor from the subset of supervisors may further be assigned to a data processing pipeline configured for the tenant. Further, the tenant may be allocated with a workspace with a GUI for designing the data processing pipeline. The data processing pipelines designed may be executed using one or more supervisors assigned to the tenant. FIG. 4 illustrates scheduling of resources for executing the data processing pipelines belonging to the tenant.

As shown in FIG. 4, the list of data processing pipelines configured for the tenant may be displayed over the GUI. For each of data processing pipeline, the supervisor scheduling module 218 may execute a scheduling method as illustrated in FIG. 4. In the first step, the supervisor scheduling module 218 may check whether the scheduling is enabled for each of the data processing pipelines. If the scheduling in not enabled, then the default scheduling technique may be applicable. Else, the supervisor scheduling module 218 is configured to implement the steps of retrieving a list of computing machines allocated to a data processing pipeline. Each computing machine retrieved is been assigned with a supervisor. Therefore, corresponding to the list of computing machines, the list of supervisors is also retrieved. After the retrieval of the computing machines and the supervisors, the supervisor scheduling module 218 may retrieve available slots (sorted in ascending order). The available slots herein indicate workers, corresponding to the supervisor, available for executing the subset of data. The supervisor scheduling module 218 may assign the slots on the computing machines for executing the data processing pipeline. The slots assigned indicate executors executing the computing tasks corresponding to the running data processing pipeline. Similarly, the aforementioned scheduling method is implemented by the supervisor scheduling module 218 for scheduling the workers for each of the data processing pipelines associated with the tenant. Thus, by choosing the computing machines for allocation before running the data processing pipeline, the system 102 is able to alleviate the technical problems of internet connectivity issues and optimal utilization of resources thereby improving the processing speed and reducing the processing time for the execution of the computing tasks.

Figure 5:
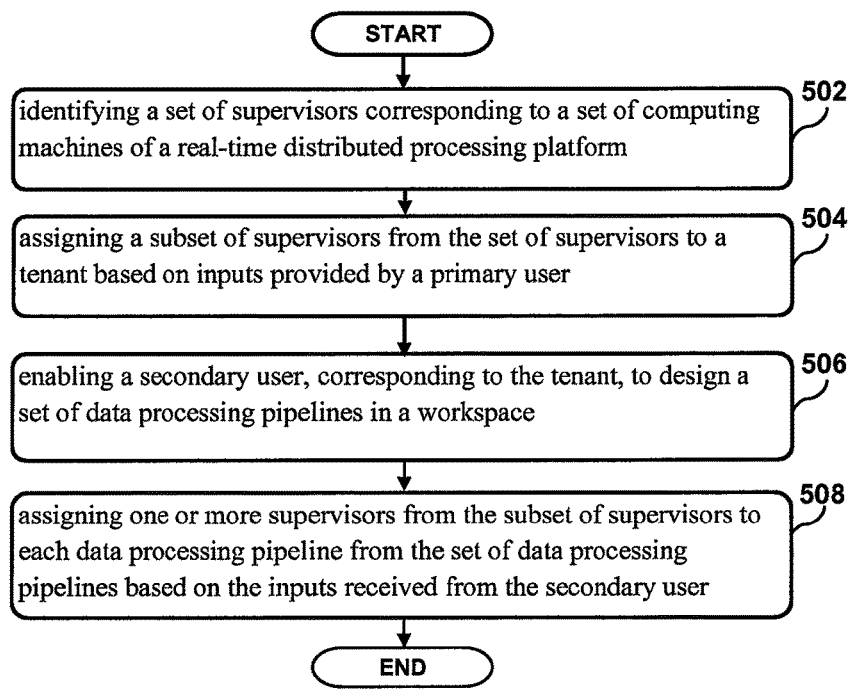
FIG. 5 illustrates a flow diagram for allocating and reserving one or more supervisors, to be used by a data processing pipeline associated with a tenant, of a real-time distributed processing platform, in accordance with an embodiment of the present subject matter.

Referring now to FIG. 5, a method 500 for allocating and reserving one or more supervisors, to be used by a data processing pipeline associated with a tenant, of a real-time distributed processing platform is disclosed, in accordance with an embodiment of the present subject matter. The method 500 may be described in the general context of computer executable instructions. Generally, computer executable instructions can include routines, programs, objects, components, data structures, procedures, modules, functions, and the like, that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method 500 or alternate methods. Additionally, individual blocks may be deleted from the method 500 without departing from the spirit and scope of the subject matter described herein. Furthermore, the method 500 can be implemented in any suitable hardware, software, firmware, or combination thereof. However, for ease of explanation, in the embodiments described below, the method 500 may be considered to be implemented in the above described system 102.

At block 502, in order to allocate the supervisors, initially the distributed platform analysis module 212 is configured to identifying a set of supervisors corresponding to a set of computing machines of the real-time distributed processing platform. In one embodiment, a supervisor may be associated with one or more computing machines from the set of computing machines of the real-time distributed processing platform. Further, the each computing machine may also be linked to one or more supervisors. In one embodiment, the supervisor is an application running on the computing machine for allocation of a set of workers running on the computing machined to one or more pipelines designed for execution over the real-time distributed processing platform.

At block 504, the supervisor allocation module 214 is configured to enable a primary user to log into the system 102 and assign a subset of supervisors from the set of supervisors to a tenant based on inputs provided by a primary user. The primary user may be an administrator of the real-time distributed processing platform. The tenant may be a customer or company registered at the real-time distributed processing platform for seeking services of the real-time distributed processing platform.

At block 506, the pipeline designing module 216 is configured to enable a secondary user, corresponding to the tenant, to design a set of data processing pipelines in a workspace. It is to be noted that the workspace comprises Graphical User Interface (GUI)/canvas in order to enable the secondary user to design each data processing pipeline from the set of data processing pipelines. In one embodiment, the secondary user may use pick and place data processing unit from the one or more data processing units available over the workspace for designing the data processing pipeline. Each of the data processing unit indicates a phase in the data processing pipeline. Further, each data processing pipeline comprises one or more data processing components from a set of data processing components, and wherein each data processing pipeline is configured to process a real time data stream specified by the secondary user.

At block 508, the supervisor scheduling module 218 is configured to assign one or more supervisors from the subset of supervisors to each data processing pipeline from the set of data processing pipelines based on the inputs received from the secondary user. In one embodiment, each supervisor is configured to operate a set of workers, wherein the supervisor is configured to allocate one or more workers, from the set of workers, to each data processing pipeline based on the inputs provided by the secondary user. In one embodiment, each worker, from the set of worker, corresponds to a portion of Central Processing Unit (CPU) and a portion of Random Access Memory (RAM) available at a computing machine from the set of computing machines.

Although implementations for methods and systems for allocation of resources in Apache® storm-based topologies have been described in language specific to structural features and/or methods, it is to be understood that the appended claims are not necessarily limited to the specific features or methods described. Rather, the specific features and methods are disclosed as examples of implementations for allocation of resources in Apache® storm-based topologies.

The invention claimed is:

1. A system for allocating and reserving one or more supervisors, to be used by a data processing pipeline associated with a tenant, of a real-time distributed processing platform, the system comprising:
   a memory; and
   a processor coupled to the memory, wherein the processor is configured to execute program instructions stored in the memory for:
      identifying a set of supervisors corresponding to a set of computing machines of a real-time distributed processing platform;
      assigning a subset of supervisors from the set of supervisors to a tenant based on inputs provided by a primary user, wherein the primary user is an administrator of the real-time distributed processing platform;
      enabling a secondary user, corresponding to the tenant, to design a set of data processing pipelines in a workspace, wherein each data processing pipeline comprises one or more data processing components from a set of data processing components, and wherein each data processing pipeline is configured to process a real time data stream; and
      assigning one or more supervisors from the subset of supervisors to each data processing pipeline from the set of data processing pipelines based on the inputs received from the secondary user, wherein each supervisor is configured to operate a set of workers, wherein each supervisor is configured to allocate one or more workers, from the set of workers, to execute each computing task corresponding to at least one data processing pipeline, wherein the one or more workers, identified by the supervisor, are workers available in real-time, from the set of workers, wherein the one or more workers, from the set of workers, are allocated to each computing task based on requirements associated with execution of each computing task, and wherein each worker, from the set of workers, corresponds to a portion of Central Processing Unit (CPU) and a portion of Random Access Memory available at a computing machine from the set of computing machines.

2. The system of claim 1, wherein the real-time distributed processing platform is Apache Storm.

3. The system of claim 1, wherein the secondary user associated with the tenant is a user registered with the real-time distributed processing platform.

4. The system of claim 1, wherein the workspace comprises a GUI, wherein the GUI enables the secondary user to design each data processing pipeline from the set of data processing pipelines, using pick and place data processing unit from the one or more data processing units.

5. The system of claim 1, wherein the supervisor is an application for allocation of workers to pipelines, in the real-time distributed processing platform.

6. A method for allocating and reserving one or more supervisors, to be used by a data processing pipeline associated with a tenant, of a real-time distributed processing platform, the method comprising steps of:
   identifying, by a processor, a set of supervisors corresponding to a set of computing machines of a real-time distributed processing platform;
   assigning, by the processor, a subset of supervisors from the set of supervisors to a tenant based on inputs provided by a primary user, wherein the primary user is an administrator of the real-time distributed processing platform;
   enabling, by the processor, a secondary user, corresponding to the tenant, to design a set of data processing pipelines in a workspace, wherein each data processing pipeline comprises one or more data processing components from a set of data processing components, and wherein each data processing pipeline is configured to process a real time data stream; and
   assigning, by the processor, one or more supervisors from the subset of supervisors to each data processing pipeline from the set of data processing pipelines based on the inputs received from the secondary user, wherein each supervisor is configured to operate a set of workers, wherein each supervisor is configured to allocate one or more workers, from the set of workers, to execute each computing task corresponding to at least one data processing pipeline, wherein the one or more workers, identified by the supervisor, are workers available in real-time, from the set of workers, wherein the one or more workers, from the set of workers, are allocated to each computing task based on requirements associated with execution of each computing task, and wherein each worker, from the set of workers, corresponds to a portion of Central Processing Unit (CPU) and a portion of Random Access Memory available at a computing machine from the set of computing machines.

7. The method of claim 6, wherein the real-time distributed processing platform is Apache Storm.

8. The method of claim 6, wherein the secondary user associated with the tenant is a user registered with the real-time distributed processing platform.

9. The method of claim 6, wherein the workspace comprises a GUI, wherein the GUI enables the secondary user to design each data processing pipeline from the set of data processing pipelines, using pick and place data processing unit from the one or more data processing units.

10. The method of claim 6, wherein the supervisor is an application for allocation of workers to pipelines, in the real-time distributed processing platform.

11. A non-transitory computer readable medium embodying a program executable in a computing device for allocating and reserving one or more supervisors, to be used by a data processing pipeline associated with a tenant, of a real-time distributed processing platform, the non-transitory computer readable medium comprising:
   a program code for identifying a set of supervisors corresponding to a set of computing machines of a real-time distributed processing platform;
   a program code for assigning a subset of supervisors from the set of supervisors to a tenant based on inputs provided by a primary user, wherein the primary user is an administrator of the real-time distributed processing platform;

a program code for enabling a secondary user, corresponding to the tenant, to design a set of data processing pipelines in a workspace, wherein each data processing pipeline comprises one or more data processing components from a set of data processing components, and wherein each data processing pipeline is configured to process a real time data stream; and a program code for assigning one or more supervisors from the subset of supervisors to each data processing pipeline from the set of data processing pipelines based on the inputs received from the secondary user, wherein each supervisor is configured to operate a set of workers, wherein each supervisor is configured to allocate one or more workers, from the set of workers, to execute each computing task corresponding to at least one data processing pipeline, wherein the one or more workers, identified by the supervisor, are workers available in real-time, from the set of workers, wherein the one or more workers, from the set of workers, are allocated to each computing task based on requirements associated with execution of each computing task, and wherein each worker, from the set of workers, corresponds to a portion of Central Processing Unit (CPU) and a portion of Random Access Memory available at a computing machine from the set of computing machines.

* * * * *